Sept. 4, 1956  H. FISCHER  2,761,567
FILTER PRESS
Filed Feb. 9, 1953  3 Sheets-Sheet 1
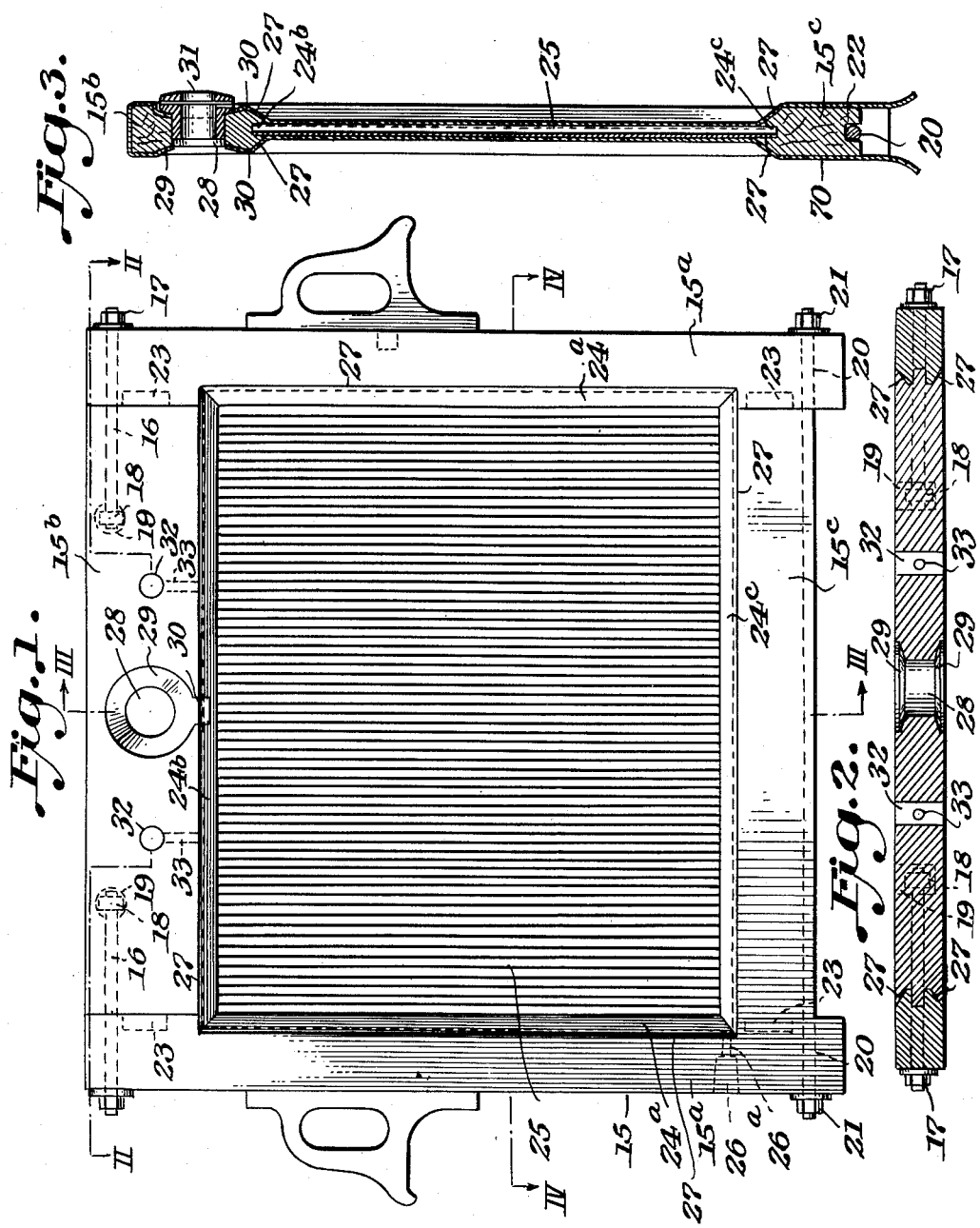
INVENTOR.
Heinz Fischer,
BY Wenderoth, Lind & Ponack
ATTYS.

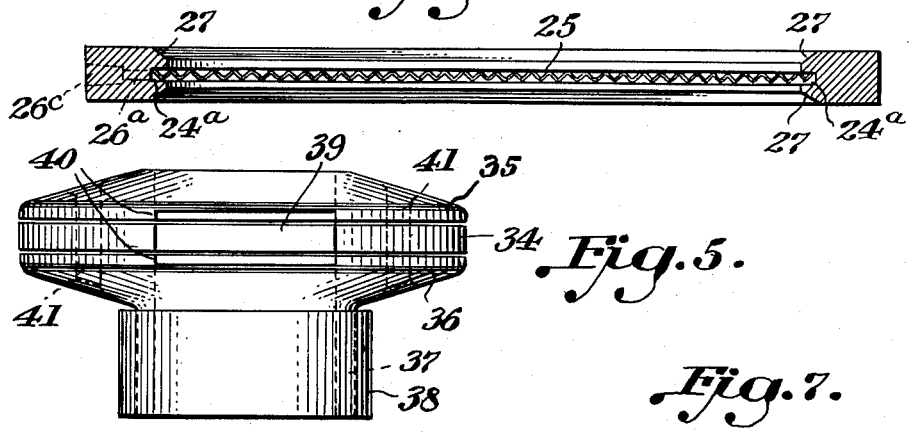
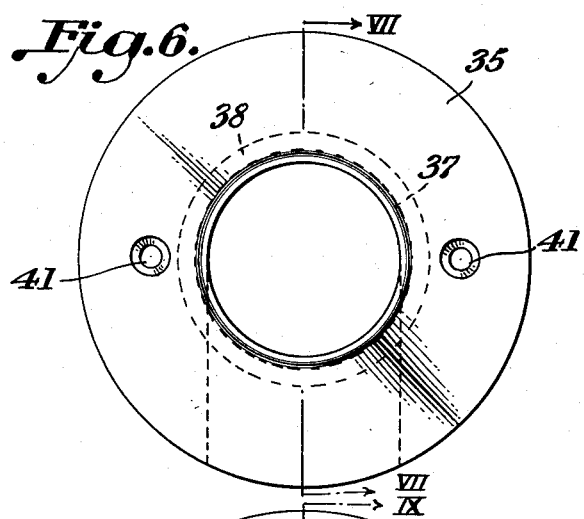
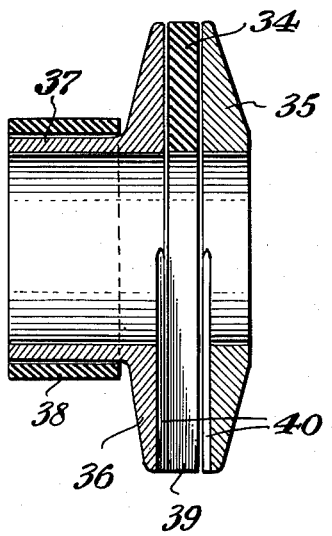
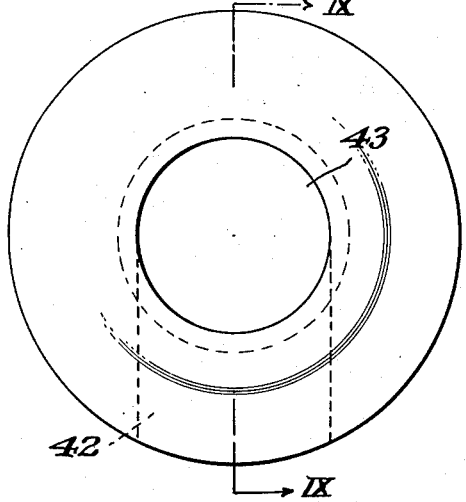

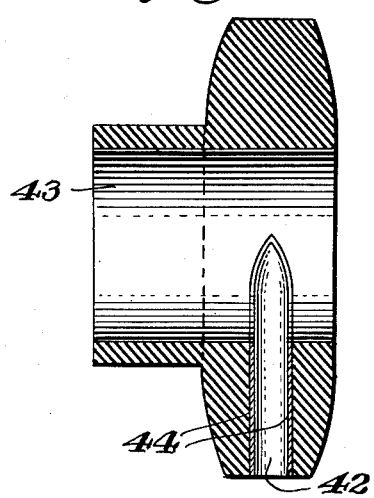
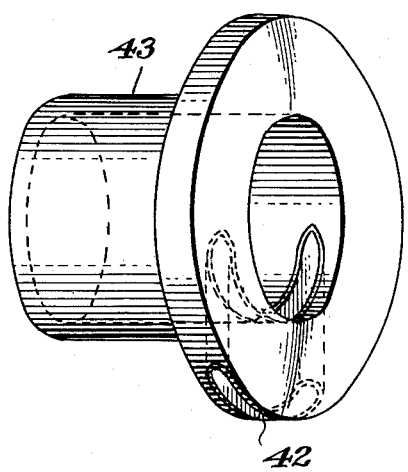
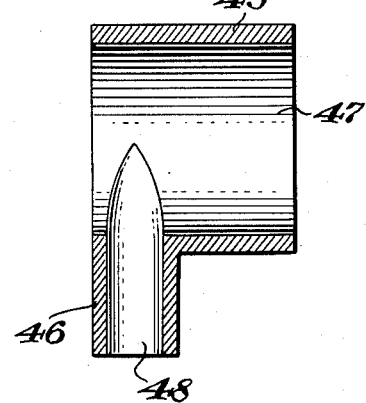
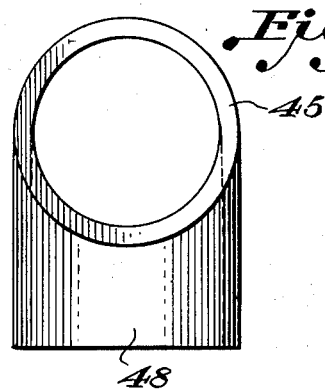
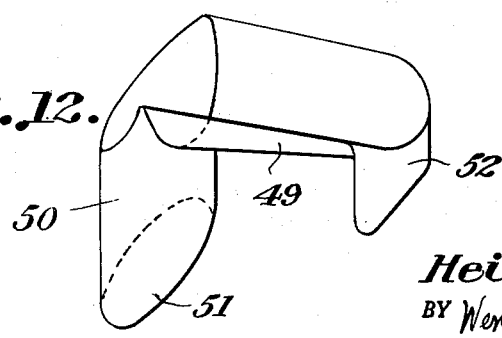

United States Patent Office 2,761,567
Patented Sept. 4, 1956

2,761,567
FILTER PRESS

Heinz Fischer, Basel, Switzerland, assignor to J. R. Geigy A. G., Basel, Switzerland, a Swiss firm Application February 9, 1953, Serial No. 335,863

Claims priority, application Switzerland February 12, 1952

4 Claims. (Cl. 210—188)

This invention relates to an improved filter press.

Filter presses used in industry normally serve as pressure filters, i. e., the liquid to be filtered is forced into the hollow spaces between the plates of the press, either by gravity or by artificial pressure, e. g. compressed air or the pressure produced by a pump. The centre plates, constituting the walls of the hollow spaces into which the liquid to be filtered is forced, which are normally used, are so constructed that they can withstand the whole of the pressure which is necessary to separate the solid parts from the liquid, not only when forming a part of the filter press, but also as single units separate from the filter apparatus. In general, this pressure is proportional to the resistance of the collected filtered material, the maximum pressure being equal to the pressure applied to the incoming liquid to be filtered. The strength of these centre plates must therefore be sufficient to withstand the pressure used for filtration and is dependent on the filter surface and the material used in the construction of the filter plates.

It has now been found that it is not necessary that the centre plates should have sufficient strength to withstand the whole of the pressure as single units separate from the filter apparatus. Since both sides of the centre plate are in contact with the filter liquid, it is only necessary that they should be able to stand the relatively slight pressure difference which can occur between two neighbouring hollow spaces. If the hollow spaces between the plates are all connected with each other then, in theory, the pressures on each side of a centre plate (which acts as a dividing wall between two adjacent hollow spaces) would be exactly equal, the centre plate acting only as a cloth support. In practice, however, this ideal case does not often occur, as the deposit which forms on the filter cloths in each hollow space will never be exactly the same so that the resistance against the mother liquor flowing through it can vary within certain limits.

The improved filter press according to the present invention therefore, is provided with filter plates, the centre plates of which are much thinner than the framework, the said centre plates acting only as cloth supports, not being sufficiently strong to withstand the total pressure as separate units, but having sufficient strength when in the body of a filter press apparatus to withstand the relatively slight difference in pressure occurring between two hollow spaces. The centre plates and frameworks of the filter plates may be constructed separately and assembled when needed. The inlet openings are constructed in such a manner that the pressure is distributed evenly between the filter plates.

The centre plates of the filter plates according to the present invention may advantageously be made of sheet iron. It is also an advantage that the surface on both sides of the centre plate be uneven so that the filtrate which penetrates through the filter cloths covering both of said surfaces can move freely between the cloth and the adjacent surface of the filter plate and escape. If the surfaces of the centre plate were smooth the filtrate would be either completely or partly prevented from escaping. A preferred type of centre plate is one which is ridged with single or multiple ribbings with straight or curved grooves, and one which has proved to be especially good is constructed of corrugated iron having vertical grooves.

The material from which the centre plate of the filter plate is constructed depends on the nature of the material to be filtered, e. g. its corrosive properties, or the relative amounts of solid and liquid matter present in the feed slurry. Examples of suitable materials are stainless steel, rubber coated sheet iron, copper, brass, sheet irons coated with precious metals, hard rubber and synthetic substances.

The frameworks for the centre plates can be made of any desired material, e. g. wood, iron or synthetic substances. The thickness of the frameworks must be such that the holes drilled through them for the admission of the feed slurry or washing water, and for removal of the filtrate, have a sufficient diameter and strength.

The invention will be more clearly understood by reference to the accompanying diagrammatic drawings which are purely illustrative of specific embodiments of the invention.

In these drawings—

Figure 1 is an elevation of one form of filter plate according to the invention, Figure 2 is a section along the line II—II of Figure 1, Figure 3 is a section along the line III—III of Figure 1, showing also an insert in position, Figure 4 is a section along the line IV—IV of Figure 1, Figure 5 is an elevation of one form of mushroom-shaped insert, Figure 6 is a plan view of this insert, Figure 7 is a section along the line VII—VII of Figure 6, Figure 8 is a plan view of another form of mushroom shaped insert, Figure 9 is a section along the line IX—IX of Figure 8, Figure 9a is a perspective view of Figure 9, Figure 10 is a sectional elevation of another form of insert, Figure 11 is a sectional end view of this form of insert, Figure 12 is a perspective view of a still further form of insert.

In the filter plate shown in Figures 1 to 4 the framework 15 is composed of side limbs 15a, a top limb 15b and a bottom limb 15c. The side limbs are attached to the top limb by means of bars 16 threaded at both ends to receive nuts 17 and 18, nuts 18 being sunk into borings 19 in the top limb 15b, and attached to the bottom limb by means of a bar 20, threaded at both ends to receive nuts 21. The bar 20 passes through both side limbs 15a and along a groove 22 (Fig. 3) cut in the outer edge of limb 15c. In order to facilitate ease of assembly, the top and bottom limbs are provided with locating members 23 which fit into complementary recesses in the side limbs. Grooves 24a, 24b and 24c cut in the inner edges of limbs 15a, 15b and 15c receive the vertically-corrugated sheet iron centre plate 25. An outlet boring 26 in one of the side limbs 15a leads into a smaller boring 26a which in turn leads into the groove 24c in the bottom limb, all of these forming a runoff channel. The inner edges of all four limbs also have a bevelling 27 (Figs. 2, 3 and 4) so that the filter cloths are not damaged during filtration. The top limb 15b has a slurry inlet comprising an aperture 28 which has depressions in the form of counterborings 29 at each end, from which depressions in the form of channels 30 are cut into the bevelling 27 of the top limb 15b. The top limb 15b is also bored to provide apertures for washing liquor and air, through inlets 32 connected to groove 24b of the top limb, through internal borings 33.

The counterbores 29 allow of the insertion of an insert 31 as shown in Fig. 3. Various forms of this insert are shown in Figures 5–12.

The form of insert illustrated in Figures 5, 6 and 7, which is substantially mushroom shaped, consists of a channel forming member in the form of an annular part 34 separating two annular frusto-conical parts 35 and 36, and a supporting member in the form of a stem 37 attached to part 36 on which is disposed a sleeve 38. When the insert is assembled the circular cutout portions in parts 34, 35 and 36 form a channel forming member having central bore throughout the length of the insert. The annular part 34 has a portion removed from the annulus so as to form a channel 39 which leads from the continuous central bore to the periphery of the annulus. The width of the channel 39 is equal to the diameter of the central bore. The parts 35 and 36 may also be partially cut away along the opening 39 as shown at 40.

In order to prevent any damage to the insert, which may be caused by any vertical or horizontal displacement of the filter plates into and between which the inserts are placed, part 34 is made of an elastic material such as rubber. The parts 34, 35 and 36 are provided with aligning bores 41 through which elastic rods may be placed. These rods ensure that the parts 34, 35 and 36 are elastically held together. In place of the elastic rods, which are suitably made of rubber, the parts 34, 35 and 36 may be simply cemented together or assembled in any suitable manner.

As may be seen from Figure 3 the stem 37 of the insert 31 and its associated sleeve 38 are placed into the opening 28 of the filter plate so that the face of part 36 is in abutting relationship with the counterbore 29. The face of part 35 then fits into the counterbored portion 29 of the adjacent filter plate, a filter cloth 70 being fitted between the insert 31 and the filter plate and so held in position. The parts 34 and 38 of the insert 31 are preferably made of elastic material, such as rubber, so that the insert fits the opening 28 well and so that there is a good tight joint between the various parts of the insert when the filter press is closed.

Figures 8 and 9 show an insert 31 which may be used in place of and is substantially similar to that shown in Figures 5–7 except that the whole insert consists of one piece of elastic material such as rubber. This insert is provided with a channel 42 which leads from the continuous central bore 43 to the periphery of the insert. So as to ensure that the channel 42 remains open when the filter press is closed its wall must be strengthened by rigid tubing 44 which is preferably elliptical in cross-section. This rigid tubing is also necessary to keep the filter cloths pressed tightly against the filter plates at this point.

Figures 10 and 11 show a further form of insert 31 which is used when the opening 28 in the filter plates is not counterbored. This insert simply consists of a hollow cylindrical supporting member 45 adapted to fit into the openings 28 of the filter plate and having, at the end remote from that fitting into the filter plate, a dependent channel forming hollow member 46, the bores 48 and 47 of the two hollow members communicating with each other at right angles. It is preferred that the bore 48 be elliptical in cross-section. The sealing around the opening 28 of the filter plate in this case is effected by the level surfaces around opening 28. The only openings which must be made in the plates are those into which the opening 48 has to fit. These openings in the plates must be exactly adapted to the openings 48 and in their measurement account must be taken of the filter cloths which lie between the openings 48 and the filter plates. It is not recommended that the opening 48 be circular in cross-section because, when closing the filter press, the filter cloths would be pressed into the recesses in the plates, owing to their depth, and so distorted and easily bunched up and would thus make it difficult to keep the filter press sealed.

A further type of insert 31 is shown diagrammatically in Figure 12. This type of insert consists of an open channel supporting member 49 provided at one end with a dependent channel forming member 50 having a bore 51 of elliptical cross-section and at the other end with a hook attachment 52 which fits into a slot provided in the opening 28 of the filter plate. There are other kinds of fastening, thus for example the insert may be provided with springs which press against the inside walls of the opening 28 in the filter plate. It is also possible to fasten the individual inserts 31 to each other so that the horizontal portion engages with its end in the adjacent insert for example by means of hooks and eyes.

All the various kinds of insert 31 are used in such a manner that the openings 39, 42, 48 and 51 lead outward and downward.

A filter press according to the invention is assembled as follows:

The first and last units in the press are of conventional construction, the other filter plates being constructed as shown in accompanying Figures 1 to 4 except that in alternate plates the openings 32 for air and washing liquor are omitted. One filter cloth covers both sides of the filter plate and is provided with the appropriate holes to coincide with the openings 28 and 32 in the filter plates. The neck of the insert shown either in Figures 5 to 7 or in Figures 8 and 9 is inserted through the hole in the filter cloth corresponding to the opening 28 in the filter plate and then into the opening 28 itself. Another filter plate according to the invention is then covered with filter cloth and fitted to the first filter plate in such a way that the part 35 of the insert holds the filter cloth against the counterbore 29 in the second filter plate. This operation is repeated as many times as necessary depending on the number of filter plates to be used and then the press is closed. The material to be filtered flows through the central bore in the inserts and then down through the opening 39 or 42 (shown in Figures 5 to 9) before passing through the filter cloths. The solid material collects on the filter cloths and the filtrate passes out through the opening 26 shown in Figure 1. When opening the press the elastic pressure of the inserts and of the stretched filter cloths comes into effect and the press opens itself to some extent as the pressure thereon is relieved.

It is obvious that in place of the ordinary filter cloths one can use elastically woven filter cloths or filter cloths with reinforcing metal threads or bands. It is obvious also that if the filter plates are made of metal they can be made all in one piece.

In filter presses according to the invention if there should happen to be an exceptional difference in pressure between the two sides of a filter plate, as can happen if the inlets to the individual chambers become blocked, then the centre plates of the filter plates may be deformed. This is a disadvantage of course, but it is offset by the great increase in utilisable volume in the press which can be as much as 90%, compared with the known filter presses. In any event this danger of blocking can be reduced if coarse filters are placed in front of the filter press.

What I claim is:

1. An improved filter press comprising a plurality of filter press plates each consisting of a frame and a central plate, and a plurality of filter cloths, at least two between each pair of adjacent press plates, at least every other frame in said filter press having a plurality of apertures opening into the space between the central plate in said every other frame and the adjacent filter cloth for the admission of washing liquid and air, each frame being provided with an aperture on the periphery thereof and at least one runoff channel therein on the opposite side thereof from said aperture, said runoff channel connected to the spaces between the filter cloths and the central plate, the central plate within the frame consisting of a material in sheet form with a thickness less than the thickness of the frame and with uneven surfaces on both sides, said sheet being strong enough to withstand only the difference in pressure between the two sides of the central plate during filtration, and an insert piece between each pair of filter press plates, said insert piece being elastic and having a supporting member forming a channel projecting through one of said filter cloths into the aperture in one of the frames for admission of feed slurry and fixing said insert piece to the filter press plate, said frame having a depression therein around the ends of said aperture, and said insert having a channel forming part having a shape complementary to the shape of said depressions extending between said frames transversely to said supporting member toward the space formed between adjacent filter cloths over said frames and communicating therewith, said channel forming part holding portions of the filter cloths between itself and the frames between which it is positioned and pressed tightly against the frames of the filter press plates for holding said filter cloths over the central plates.

2. An improved filter press as claimed in claim 1 in which the frames of adjacent filter press plates have opposed depressions cut therein forming a channel communicating with the space between the central plates, and said elastic insert piece consists of a hollow tubular supporting member projecting into the aperture in one of said filter press plates and a channel forming part extending between the frames and transversely to said supporting member projecting into the depressions in said frames holding the filter cloths between the insert piece and the frames and pressed tightly against the frames.

3. An improved filter press as claimed in claim 2 in which the opposed depressions are conical counterbores around the aperture and the channel forming member is an annular ring with conically shaped ends projecting into the conical counterbores and having a channel formed substantially radially therein.

4. An improved filter press as claimed in claim 2 in which the opposed depressions are channel forming depressions on the opposed faces of the frames and said channel forming member has the exact shape to conform to the shape of said opposed channel forming depressions.

References Cited in the file of this patent

UNITED STATES PATENTS

| | | |
|---|---|---|
| 953,495 | Stockheim | Mar. 29, 1910 |
| 1,516,463 | Stuart | Nov. 18, 1924 |
| 1,801,933 | Ouss | Apr. 21, 1931 |

FOREIGN PATENTS

| | | |
|---|---|---|
| 19,773 | Austria | Apr. 10, 1905 |
| 185,116 | Great Britain | July 12, 1923 |
| 238,568 | Germany | Sept. 28, 1911 |